(12) United States Patent
Banks

(10) Patent No.: US 7,878,096 B2
(45) Date of Patent: Feb. 1, 2011

(54) CNC COOLANT NOZZLE

(75) Inventor: Anton G. Banks, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1148 days.

(21) Appl. No.: 11/546,789

(22) Filed: Oct. 11, 2006

(65) Prior Publication Data

US 2008/0098954 A1    May 1, 2008

(51) Int. Cl.
    *B23B 35/00*    (2006.01)
    *B05C 5/00*    (2006.01)
(52) U.S. Cl. ............................ 82/1.11; 82/50; 408/56
(58) Field of Classification Search ................. 82/1.11, 82/50, 900; 407/11, 54; 239/587.1; 118/300; 408/56, 61, 60; 409/131, 135
    See application file for complete search history.

(56) References Cited

U.S. PATENT DOCUMENTS

| | | | | |
|---|---|---|---|---|
| 2,706,236 A * | 4/1955 | Stepath et al. | ................. | 219/70 |
| 2,805,098 A * | 9/1957 | Hurley | ........................ | 239/227 |
| 3,333,489 A * | 8/1967 | Mossberg | .................... | 408/60 |
| 3,741,049 A * | 6/1973 | Anderson | .................... | 82/161 |
| 4,929,131 A * | 5/1990 | Allemann | .................... | 409/234 |
| 5,288,186 A * | 2/1994 | Kovacevic | .................. | 409/131 |
| 6,471,448 B1 * | 10/2002 | Lagerberg | ...................... | 407/2 |
| 6,595,727 B2 * | 7/2003 | Arvidsson | .................... | 407/35 |

FOREIGN PATENT DOCUMENTS

| | | |
|---|---|---|
| DE | 2905579 A1 | 9/1979 |
| DE | 20319125 U1 | 4/2004 |

\* cited by examiner

*Primary Examiner*—Will Fridie, Jr.
(74) *Attorney, Agent, or Firm*—Bachman & LaPointe, P.C.

(57) ABSTRACT

A variable position nozzle assembly for a milling or grinding machine where a nozzle is positioned to target coolant to the cutting area of a chosen tool. Each tool may have a different length or cutting or grinding surface width. The CNC program that directs tool motion and tool changes, re-aims the variable position nozzle assembly based on a chosen tool and the dynamic position of the tool as it traverses a workpiece.

17 Claims, 5 Drawing Sheets

CNC COOLANT NOZZLE

BACKGROUND OF THE INVENTION

The invention relates generally to machine cutting fluid or coolant systems. More specifically, the invention relates to a nozzle assembly that varies the spray patterns of cutting machine coolant nozzles.

Milling and grinding machines need to have coolant directed to specific areas during cutting. Cutting fluid, or coolant, is liquid used to cool and lubricate the cutting edges of machine tools and the pieces they are shaping. It is pumped over the cutting site of machines such as lathes, milling machines, shapers, grinders and saws.

Metal cutting operations generate heat due to friction between a tool and a workpiece. The heat generated is from energy lost deforming the material and needs to be carried away. Water is a conductor of heat but is not stable at high temperatures, so stability is often achieved by making an emulsion of water with oil. The goal is to keep the workpiece at a stable temperature and maximize the life of the cutting tool by lubricating its working edge to reduce tip welding.

To ensure cutting edge cooling, the coolant stream must be aimed at the point where the cutting tool is removing metal. Manual systems require machine operators to constantly adjust the coolant systems to make sure coolant is aimed in the right position to flood the work zone. While coolant lines and nozzles are easy to adjust, having to make adjustments every time a tool change takes place is inefficient. It is also dangerous if an operator reaches into a machine with its spindle turning.

The benefits of keeping coolant on target make substantial contributions to productivity. It minimizes the risk of damaging heat build-up in the workpiece or cutting tool thereby preserving tool life. It allows optimal feed rates and speeds to be applied more safely and flushes away swarfs and chips.

What is desired is an apparatus that can be applied to an existing milling or grinding machine that targets coolant to a best location on a cutting tool in response to a machine program and allows machine operators to leave a machine untended for extended periods.

SUMMARY OF THE INVENTION

The inventor has discovered that it would be desirable to have a variable position nozzle assembly for a milling or grinding machine where at least one nozzle is positioned to target coolant to the cutting area of a chosen tool. Each tool may have a different length or cutting or grinding surface width. The CNC program that directs tool motion and tool changes, re-aims the variable position nozzle assembly based on a chosen tool and the dynamic position of the tool as it traverses a workpiece.

One aspect of the invention provides a variable position nozzle assembly for a machining tool. Variable position nozzle assemblies according to this aspect comprise a base plate having an aperture defining a center axis, at least one swivel nozzle coupled to the base plate, a static guide having an aperture corresponding to the base plate aperture and a number of radial slots corresponding to the number of swivel nozzles wherein the at least one swivel nozzle passes through, and an adjustment plate having an aperture corresponding to the base plate aperture and a number of linear slots corresponding to the number of swivel nozzles wherein the at least one swivel nozzle passes through and the adjustment plate is rotationally coupled to the static guide wherein the linear slots in conjunction with the static guide radial slots adjusts the at least one swivel nozzle towards the center axis or away from the center axis depending on a rotation position.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Embodiments of the invention provide a variable position nozzle assembly for milling and grinding machines that targets coolant to specific locations along a tool axis using at least one nozzle.

Figure 1:
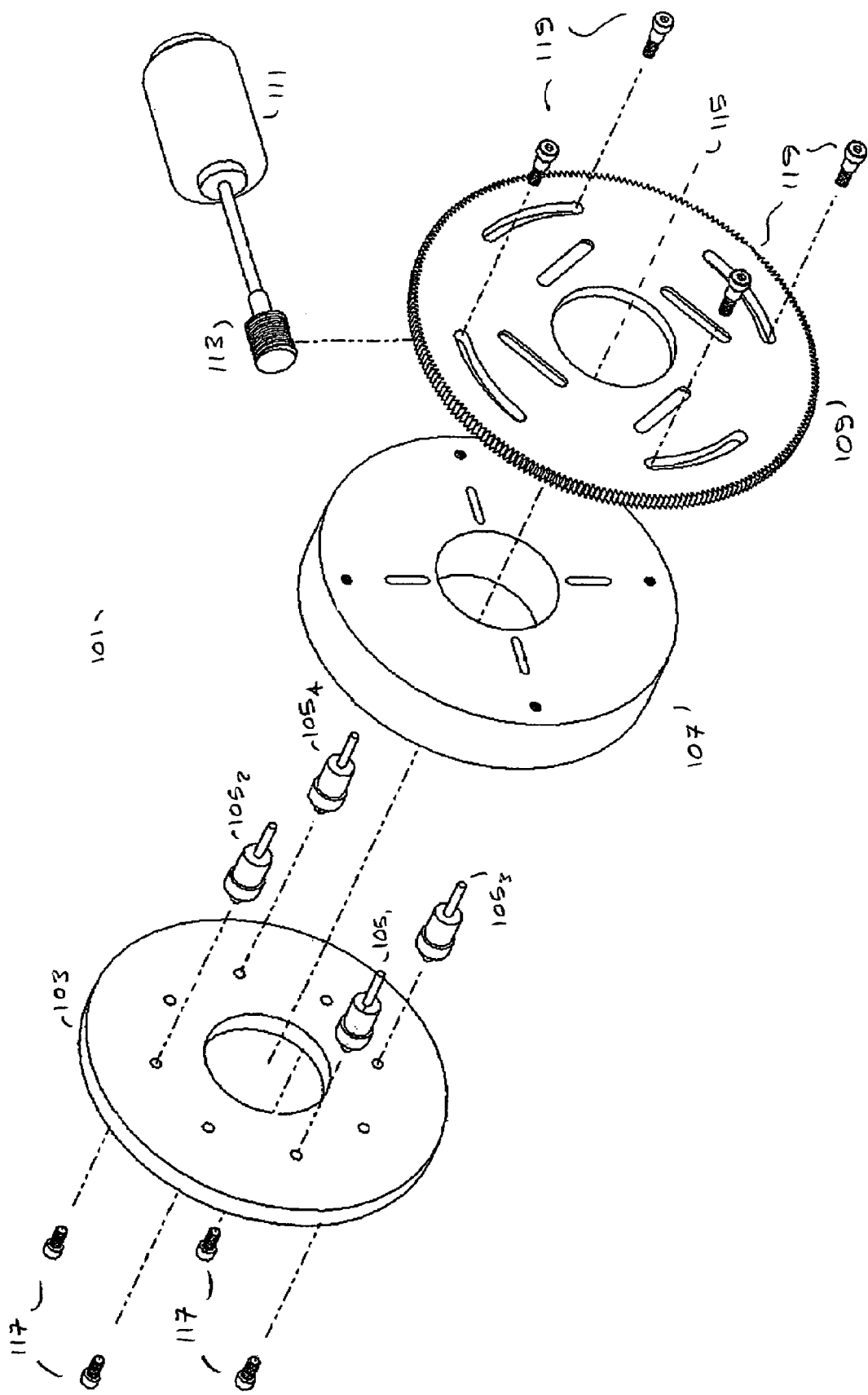
FIG. 1 is an exemplary exploded perspective view of one embodiment of the invention.

Shown in FIG. 1 is the variable position nozzle assembly 101 of the invention. The assembly 101 comprises a base plate 103, at least one swivel nozzle $105_n$ (n=1,2,3,...,N), a static guide 107, an adjustment plate 109 and a stepper motor 111 with a worm gear 113 coupled to its shaft. The base plate 103 provides a mounting surface for each swivel nozzle $105_n$ employed, and an attachment surface for securing the invention to a milling or grinding machine (not shown). The rotating part of the machine passes through a center aperture 115 along a center axis of the assembly 101. The static guide 107 may be coupled to the base plate 101 using, for example, cap or machine screw hardware 117. The base plate 103 and static guide 107 are generally circular in configuration, but may take on other shapes to fit specific applications.

Figure 2:
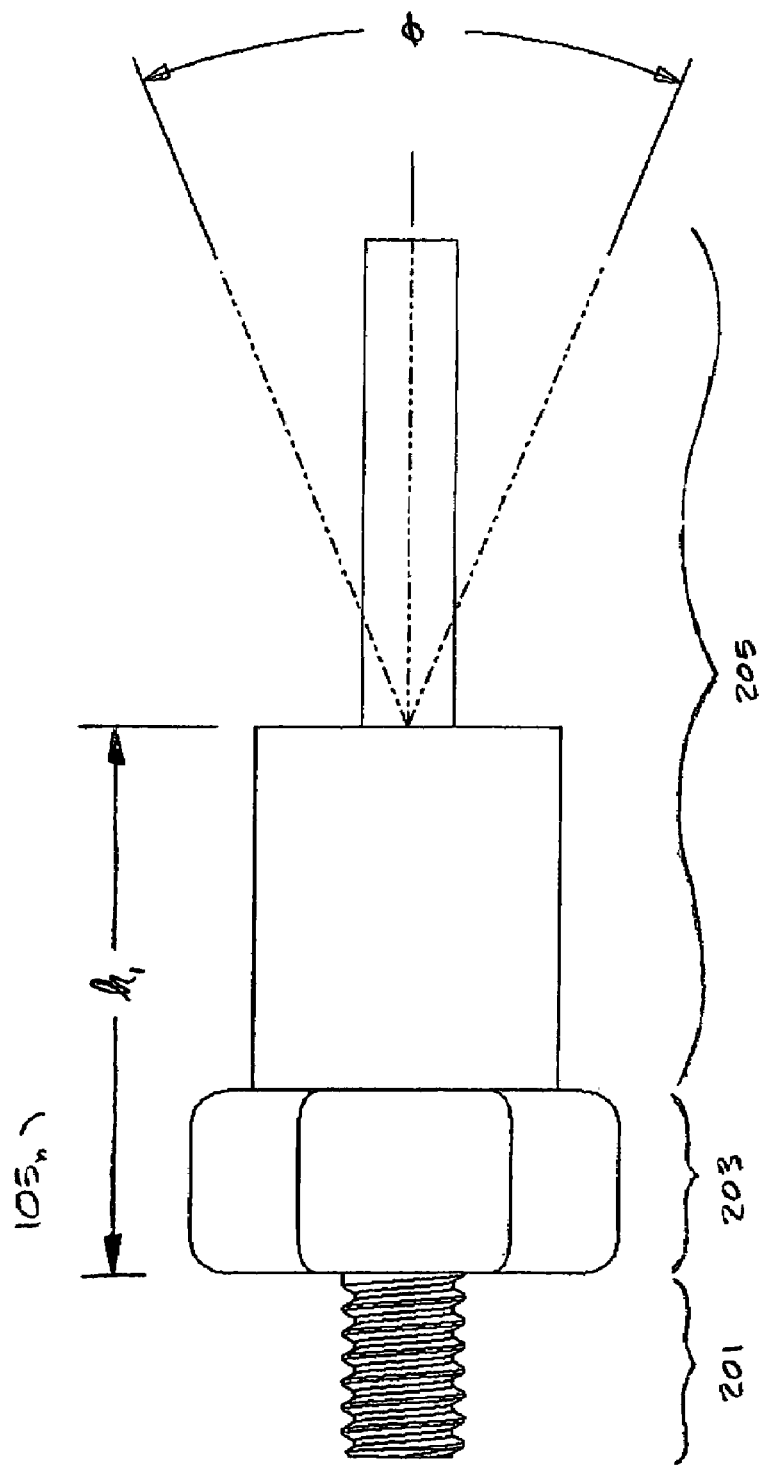
FIG. 2 is a side view of an exemplary swivel nozzle.

A preferred embodiment employs four swivel nozzles $105_1$, $105_2$, $105_3$, $105_4$. Shown in FIG. 2 is a swivel nozzle $105_n$. Each swivel nozzle $105_n$ comprises a hollow threaded portion 201, a hexagonal base 203, and a ball joint with nozzle 205. The ball joint allows for the nozzle 205 to negotiate a conical arc θ. The arc θ may be in a range of from 30° to 45°.

A swivel nozzle $105_n$ height $h_1$ is defined by the hexagonal base 203 and ball joint length of a nozzle 205.

Figure 3:
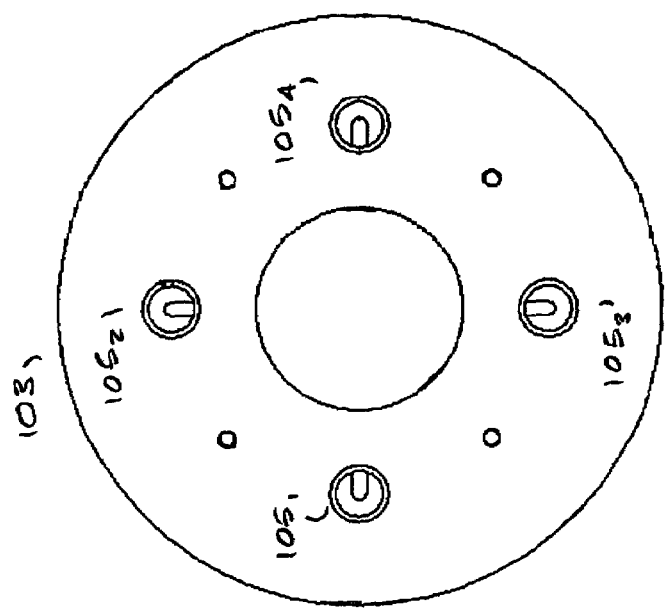
FIG. 3 is a plan view of an exemplary base plate.

For the number N of nozzles $105_n$ desired, the base plate 103 may be radially divided by N where each swivel $105_n$ may be located as shown in FIG. 3. For four swivel nozzles $105_1$, $105_2$, $105_3$, $105_4$, each is located 90° apart. The angular difference between nozzle locations need not be equal and may be adjusted according to a specific application.

At each swivel nozzle location, the base plate 103 is drilled and tapped in matching outer diameter and thread pitch with the swivel nozzle hollow threaded portion 201. The base plate thickness is sized such that the swivel nozzle $105_n$ threaded portion 201 passes through the base plate 101 and allows for coupling with a coolant fluid manifold (not shown) on an outer side of the base plate 103. Coupling to the coolant fluid manifold may be via compression, swaged, or barbed tubing fittings.

Figure 4B:
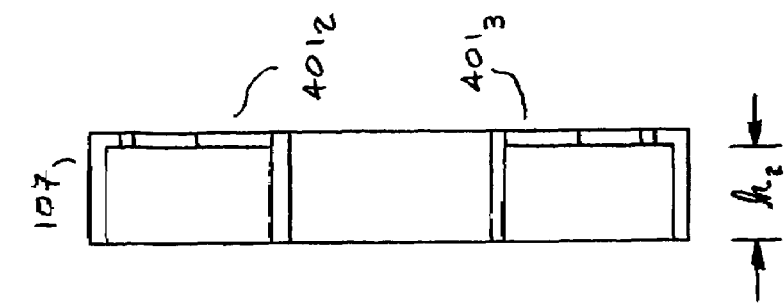
FIG. 4B is a side sectional view of the exemplary static guide shown in FIG. 4A taken along line 4B-4B.
Figure 4A:
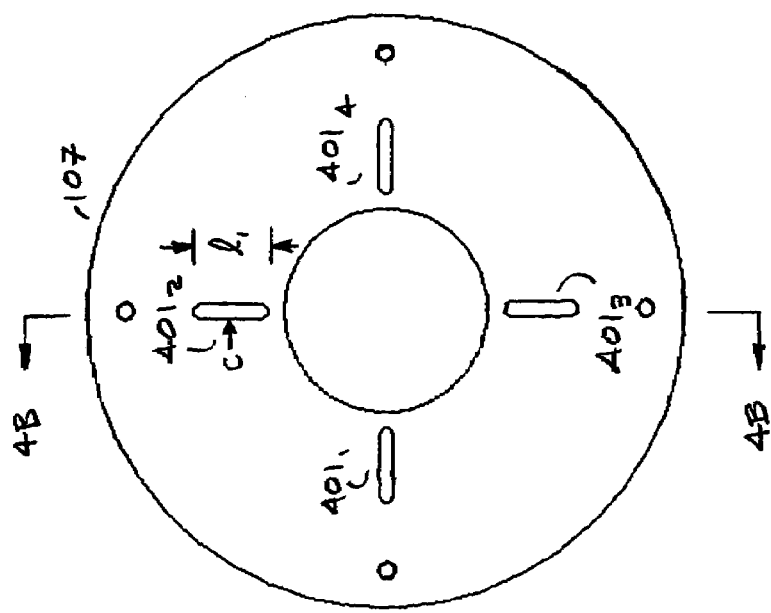
FIG. 4A is a plan view of an exemplary static guide.

Shown in FIGS. 4A and 4B is the static guide 107. The static guide 107 covers the mounted swivel adapters $105_1$, $105_2$, $105_3$, $105_4$ and is coupled to the base plate 103. The static guide 107 has radial slots $401_n$ (n=1,2,3, . . . ,N) corresponding to the number of swivel nozzles $105_n$ employed with each slot $401_n$ having a center c and a length $l_1$. Each static guide slot $401_n$ is centered c above a swivel adapter $105_n$. Each static guide slot $401_n$ length $l_1$ defines a maximum range of nozzle travel θ in one plane. The static guide 107 internal depth $h_2$ is dimensioned to accommodate the swivel nozzle height $h_1$, where $h_2 > h_1$. The static guide slot $401_n$ allows for directing a nozzle $105_n$ in a radial direction.

Figure 5C:
FIG. 5C is a side view of the exemplary adjustment plate shown in FIG. 5A.
Figure 5B:
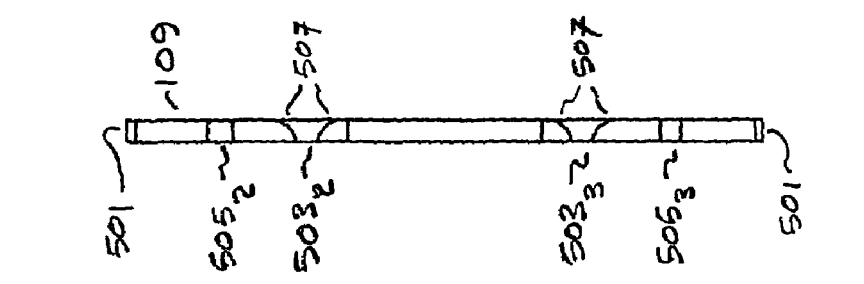
FIG. 5B is a side sectional view of the exemplary adjustment plate shown in FIG. 5A taken along line 5B-5B.
Figure 5A:
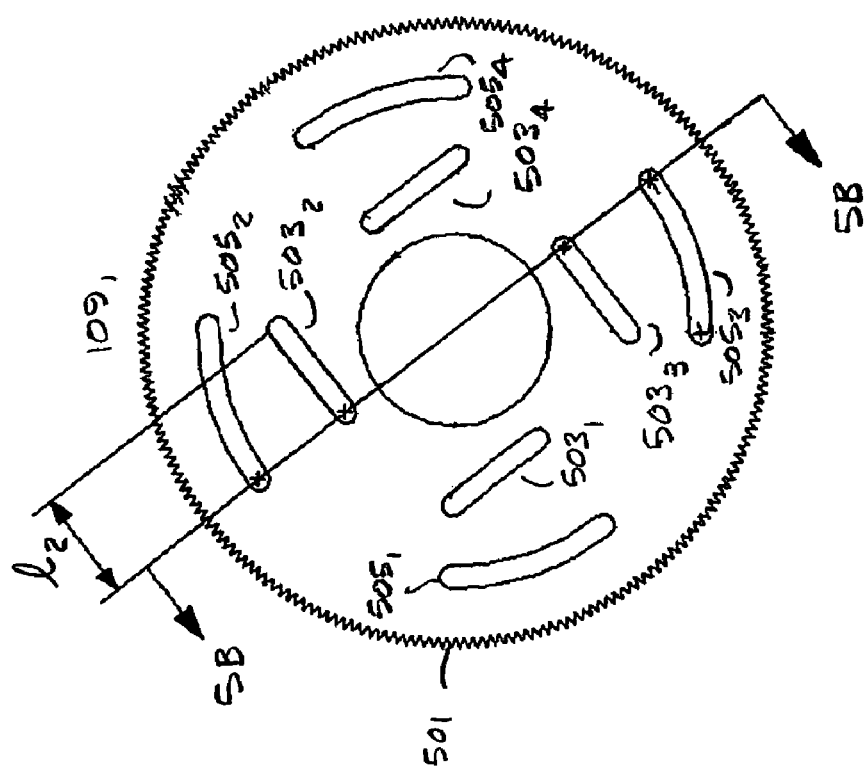
FIG. 5A is a plan view of an exemplary adjustment plate.

To vary the radial position of the swivel nozzles $105_n$ during machine operation, the adjustment plate 109 is mounted on the static plate 107 using shoulder cap or machine screw hardware 119 to allow for limited rotation. The adjustment plate is shown in FIGS. 5A, 5B and 5C.

The adjustment plate 109 includes a toothed outer periphery 501 for engaging the worm gear 113 of the stepper motor 111, at least one adjustment plate linear slot $503_n$ (n=1,2,3, . . .,N) for engaging and varying the position of a swivel nozzle $105_n$ and a plurality of arcuate slots $505_1$, $505_2$, $505_3$, $505_4$ that act as guides in conjunction with the shoulder screw hardware 119 for locating the adjustment plate on the static guide 107 and to allow rotation about the center axis 115. The edge of the adjustment plate 109 linear slot $503_n$ may be continuously chamfered, or radiused 507 on the outboard side.

Figure 6B:
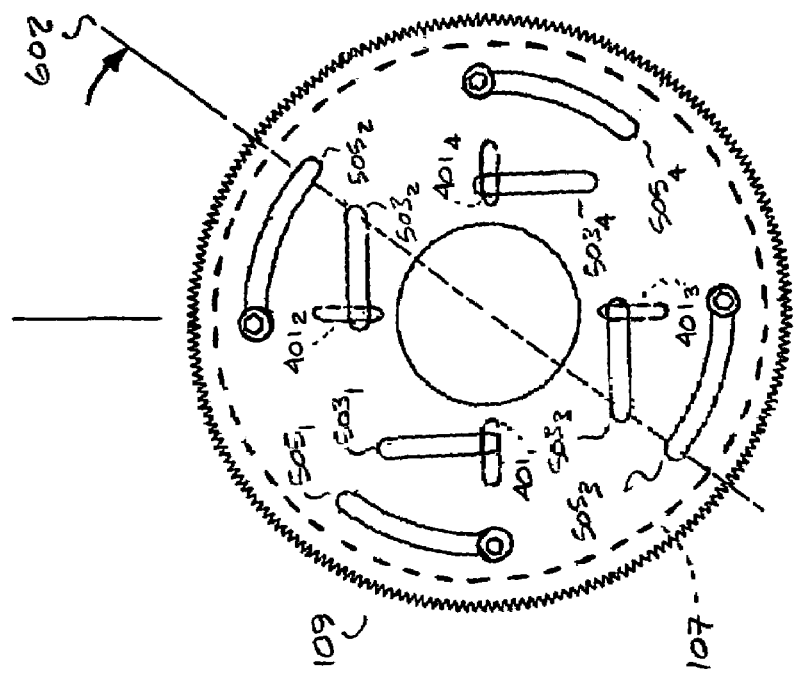
FIG. 6B is a front view of the invention shown in FIG. 1 in a second position.
Figure 6A:
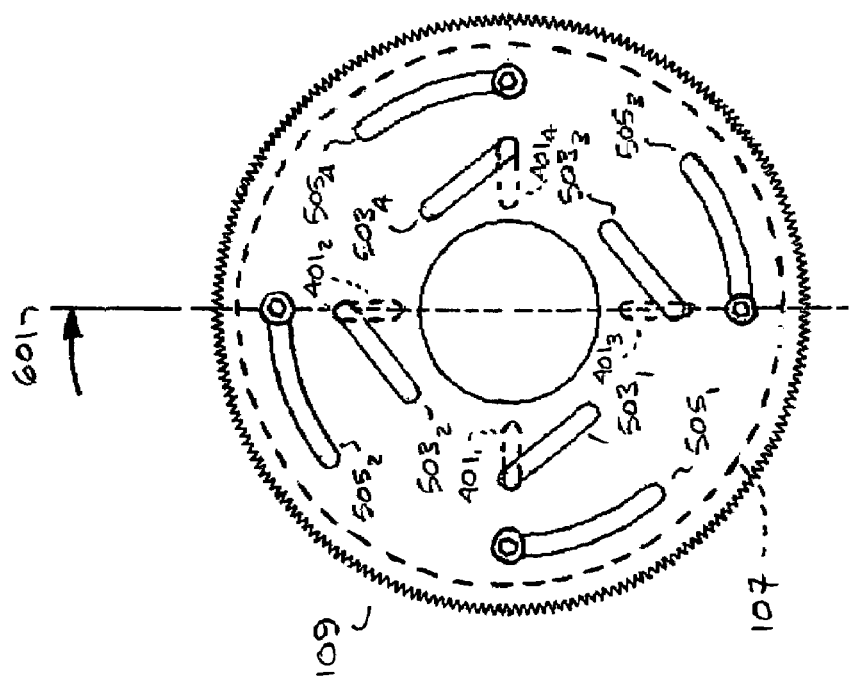
FIG. 6A is a front view of the invention shown in FIG. 1 in a first position.

By rotating the adjustment plate 109 from a first position 601 shown in FIG. 6A to a second position 602 shown in FIG. 6B, the angle θ of the swivel nozzles $105_n$ changes due to the intersection of the guide plate slots $401_n$ and adjustment plate slots $503_n$. The adjustment plate slots $503_n$ provide a camming action, translating the circular motion of the adjustment plate 109 to a radial nozzle $105_n$ position. FIG. 6A shows the nozzles spraying coolant away from the center axis, FIG. 6B shows the nozzles spraying coolant towards the center axis 115.

The stepper motor 111 and worm gear 113 provide the means to rotate the adjustment plate 109 from the first position 601 to the second position 602 and any intermediate position in response to a control signal (not shown). The positions of the swivel nozzles $105_n$ may therefore vary by θ depending on the control signals sent to the stepper motor 111 by the CNC system of a machine the variable nozzle assembly is mounted on.

CNC stands for computer numerical control and refers specifically to a computer controller that reads G-code instructions and drives the machine tool. CNC automation allows for flexibility in the way parts are held in the manufacturing process and the time required to change the machine to produce different components. In a production environment, a series of CNC machines may be combined into one station, refered to as a cell, to progressively machine a part requiring several operations. Most CNC machines today are controlled directly from files created by CAM (computer-aided manufacturing) software packages, so that a part or assembly can go directly from design to manufacturing without the need of producing a drafted paper drawing of the manufactured component.

CAM software generally requires an operator with much knowledge and skill of machining to select the milling machine and define the necessary parameters and strategies that will generate an effective tool path. Most software performs multi-surface machining. Most machining progresses through roughing, semi-finishing, and finishing depending on the workpiece material and the software available. All machining algorithms rely on finding valid cutter locations of the milling cutter against a workpiece. At each cutter location on the workpiece, the variable nozzle assembly 101 may adjust the position of the swivel nozzles $105_n$.

The stepper motor 111 varies the direction, or target, of the coolant stream in conjunction with the CNC program. The invention responds accordingly while the machine is running to software commands via the stepper motor 111. The variable nozzle assembly 101 is coupled to the machine's head and is oriented so the coolant stream is aligned with a spindle centerline 115. The system is designed for installation on any machining center with a standard coolant pump. The existing coolant pump for the machine may be plumbed to the variable nozzle assembly 101.

The CNC program directs tool changes and re-aims the variable nozzle assembly 101 automatically based on the chosen tool. The variable position nozzle assembly 101 adjusts its position in response to CNC instructions to target coolant to a best location. A location may be static or dynamic in response to the CNC program.

The CNC system may derive a separate nozzle position program based on a workpiece program in conjunction with what tool from its tool changer is selected. Whenever a specific tool is placed in the machine spindle, the CNC program directs the variable position nozzle assembly 101 to target the flow of coolant to a specific location as work progresses.

The variable position nozzle assembly 101 may target coolant to specific cutting tool locations in real-time in response to a CNC program as a workpiece is being machined. For example, if the variable position nozzle assembly 101 is coupled to a vertical mill, as a tool plunges into a workpiece, the nozzle assembly would maintain the coolant target to the exposed edge of the tool as directed by the CNC program. If a 6 inch drill bit were being used, and the mill has progressed to a depth of 2 inches, the variable position nozzle assembly 101 in response to the CNC program would continually move the coolant target from the drill tip along the drill shaft to where the drill bit enters the workpiece. In this manner, as the tool drills deeper into the workpiece, the variable position nozzle assembly 101 continually targets coolant to where the drill bit is exposed and where the coolant may flood the entry hole and remove swarfs and chips. If the nozzle position was static, positioned at the tip of a drill bit, as soon as the drill enters a workpiece, the coolant direction would no longer be on target since the tip is obscured by the workpiece. As machining progresses, the coolant target would move farther away from the entry hole, moving the coolant flooding region away from the entry hole. The variable position nozzle assembly 101 supports both carousel and double-arm type tool changers.

One or more embodiments of the present invention have been described. Nevertheless, it will be understood that various modifications may be made without departing from the spirit and scope of the invention. Accordingly, other embodiments are within the scope of the following claims.

What is claimed is:

1. A variable position nozzle assembly comprising:
   a base plate having an aperture defining a center axis;
   at least one swivel nozzle coupled to the base plate;
   a static guide having an aperture corresponding to the base plate aperture and a number of radial slots corresponding to the number of swivel nozzles wherein at least one swivel nozzle passes through; and
   an adjustment plate having an aperture corresponding to the base plate aperture and a number of linear slots corresponding to the number of swivel nozzles wherein at least one swivel nozzle passes through and the adjustment plate is rotationally coupled to the static guide wherein the linear slots in conjunction with the static guide radial slots adjusts at least one swivel nozzle towards the center axis or away from the center axis depending on an adjustment plate rotation position.

2. The variable position nozzle assembly according to claim 1 further comprising a stepper motor for adjusting the adjustment plate rotation position.

3. The variable position nozzle assembly according to claim 2 wherein the adjustment plate is circular.

4. The variable position nozzle assembly according to claim 3 wherein the adjustment plate further comprises a toothed edge on its outer periphery.

5. The variable position nozzle assembly according to claim 4 wherein the stepper motor further comprises a worm gear coupled to a shaft of the stepper motor, the worm gear pitch is in matching correspondence with the adjustment plate toothed edge.

6. The variable position nozzle assembly according to claim 5 wherein the stepper motor actuation is in response to a control signal input.

7. The variable position nozzle assembly according to claim 6 wherein the control signal is output from a CNC program.

8. The variable position nozzle assembly according to claim 7 wherein the CNC program adjusts the at least one swivel nozzle to a target.

9. A method of providing coolant to a workpiece during a machining operation comprising:
   providing a swivel coolant nozzle coupled to a base plate;
   engaging the swivel coolant nozzle with a slot in a static guide;
   engaging the swivel coolant nozzle with a slot in an adjustment plate; and
   rotating the adjustment plate to vary the swivel coolant nozzle direction.

10. The method according to claim 9 further comprising transferring rotation from a stepper motor to the adjustment plate.

11. The method according to claim 10 further comprising controlling the stepper motor with commands from a CNC program.

12. The method according to claim 11 wherein controlling the stepper motor further comprises adjusting the nozzle in response to the CNC program to aim the swivel coolant nozzle to a target.

13. The method according to claim 12 wherein the CNC program chooses a best target for the swivel coolant nozzle.

14. The method according to claim 13 wherein the best target is where a cutting edge of a machining tool contacts the workpiece.

15. The method according to claim 13 wherein the best target is a machining tool entry hole in the workpiece.

16. The method according to claim 13 wherein the swivel coolant nozzle direction varies either away or towards a rotational axis of the cutting tool.

17. A method of providing coolant to a workpiece during a machining operation comprising:
   providing a swivel coolant nozzle coupled to a base plate;
   engaging a pivoting portion of the swivel coolant nozzle with a radial slot in a static guide;
   engaging the pivoting portion of the swivel coolant nozzle with a linear slot in an adjustment plate; and
   rotating the adjustment plate to vary the pivoting portion of the swivel coolant nozzle in a radial direction.

* * * * *